(12) United States Patent
Newman (10) Patent No.: US 10,774,968 B2
(45) Date of Patent: Sep. 15, 2020

(54) POLYGON WIRE RING FOR RETAINING AN INTERNAL COMPONENT OF A VALVE TO AN EXTERNAL COMPONENT THEREOF

(71) Applicant: Sun Hydraulics, LLC, Sarasota, FL (US)

(72) Inventor: Andrew Newman, Sarasota, FL (US)

(73) Assignee: Sun Hydraulics, LLC, Sarasota, FL (US)

( * ) Notice: Subject to any disclaimer, the term of this patent is extended or adjusted under 35 U.S.C. 154(b) by 64 days.

(21) Appl. No.: 16/257,403

(22) Filed: Jan. 25, 2019

(65) Prior Publication Data
US 2020/0240563 A1    Jul. 30, 2020

(51) Int. Cl.
*F16L 37/46* (2006.01)
*F16K 3/22* (2006.01)
*F16K 27/04* (2006.01)
*B23P 15/00* (2006.01)

(52) U.S. Cl.
CPC ............ *F16L 37/46* (2013.01); *F16K 3/22* (2013.01); *F16K 27/041* (2013.01); *B23P 15/001* (2013.01)

(58) Field of Classification Search
CPC .......... F16L 37/46; F16K 3/22; F16K 27/041; B23P 15/001; F16B 21/18–186

USPC .......................................................... 411/517
See application file for complete search history.

(56) References Cited

U.S. PATENT DOCUMENTS

| 4,195,944 | A | * | 4/1980 | Cross | F16B 21/18 403/326 |
|---|---|---|---|---|---|
| 4,560,142 | A | * | 12/1985 | Burton | F16B 21/18 251/306 |
| 5,381,823 | A | * | 1/1995 | DiBartolo | F16K 17/065 137/494 |
| 9,850,919 | B2 | * | 12/2017 | Zaehe | F15B 13/015 |
| 2014/0023459 | A1 | * | 1/2014 | Ayad | F16B 21/186 411/517 |
| 2018/0050356 | A1 | * | 2/2018 | Gehrung | B05B 7/083 |

* cited by examiner

*Primary Examiner* — Marina A Tietjen
(74) *Attorney, Agent, or Firm* — McDonnell Boehnen Hulbert & Berghoff LLP (57) ABSTRACT

An example wire ring is configured as a partial polygon. The partial polygon has a plurality of curved sections interposed between a plurality of straight sections. The wire ring is configured to contact a base of an annular groove of an external component of a valve at multiple contact points. The wire ring is also configured to contact a respective base of a respective annular groove of an internal component of the valve disposed, at least partially, within the external component at multiple respective contact points.

20 Claims, 6 Drawing Sheets

```
┌─────────────────────────────────────────────────────────────┐
│  PROVIDING A SLEEVE OF A VALVE, THE SLEEVE HAVING A FIRST   │
│  ANNULAR GROOVE DISPOSED ON AN INTERIOR PERIPHERAL SURFACE  │── 702
│  OF THE SLEEVE, WHERE THE FIRST ANNULAR GROOVE HAS A FIRST  │
│                            BASE                             │
└─────────────────────────────────────────────────────────────┘
                              │
                              ▼
┌─────────────────────────────────────────────────────────────┐
│  PROVIDING A NOSE PIECE OF THE VALVE, WHERE THE NOSE PIECE  │
│  INCLUDES A SECOND ANNULAR GROOVE DISPOSED ON AN EXTERIOR   │── 704
│  PERIPHERAL SURFACE OF THE NOSE PIECE, WHERE THE SECOND     │
│           ANNULAR GROOVE HAS A SECOND BASE                  │
└─────────────────────────────────────────────────────────────┘
                              │
                              ▼
┌─────────────────────────────────────────────────────────────┐
│  POSITIONING A WIRE RING IN THE SECOND ANNULAR GROOVE OF THE│
│  NOSE PIECE, WHERE THE WIRE RING COMPRISES A PARTIAL POLYGON│── 706
│  HAVING CURVED SECTIONS INTERPOSED BETWEEN STRAIGHT SECTION │
└─────────────────────────────────────────────────────────────┘
                              │
                              ▼
┌─────────────────────────────────────────────────────────────┐
│  INSERTING THE NOSE PIECE INTO THE SLEEVE, WHERE THE SLEEVE │
│  HAS A CHAMFERED ANNULAR SURFACE DISPOSED IN THE INTERIOR   │
│  PERIPHERAL SURFACE OF THE SLEEVE AT A DISTAL END THEREOF   │── 708
│  THAT CAUSES THE WIRE RING TO BE COMPRESSED AS THE NOSE     │
│             PIECE IS INSERTED INTO THE SLEEVE               │
└─────────────────────────────────────────────────────────────┘
                              │
                              ▼
┌─────────────────────────────────────────────────────────────┐
│  ALIGNING THE SECOND ANNULAR GROOVE OF THE NOSE PIECE WITH  │
│  THE FIRST ANNULAR GROOVE OF THE SLEEVE, THEREBY CAUSING THE│
│  WIRE RING TO EXPAND AND ASSUME AN ANNULAR SPACE FORMED     │
│  BETWEEN THE SECOND ANNULAR GROOVE OF THE NOSE PIECE AND    │
│  THE FIRST ANNULAR GROOVE OF THE SLEEVE, WHERE AN EXTERIOR  │── 710
│  SURFACE OF THE WIRE RING CONTACTS THE FIRST BASE OF THE FIRST│
│  ANNULAR GROOVE AT MULTIPLE POINTS, AND WHERE AN INTERIOR   │
│  SURFACE OF THE WIRE RING CONTACTS THE SECOND BASE OF THE   │
│   SECOND ANNULAR GROOVE AT RESPECTIVE MULTIPLE POINTS       │
└─────────────────────────────────────────────────────────────┘
```

FIG. 7

POLYGON WIRE RING FOR RETAINING AN INTERNAL COMPONENT OF A VALVE TO AN EXTERNAL COMPONENT THEREOF

BACKGROUND

A hydraulic valve directs the flow of a liquid medium, usually oil, through a hydraulic system. The direction of the oil flow is determined by the position of a spool or a poppet. The size of the valve may be determined by the maximum flow of the hydraulic system through the valve and the maximum system pressure.

An example valve may have several components, such as a housing, a sleeve, a movable element (e.g., a poppet, spool, or piston), a bushing, a nose piece, etc. Some of these components are disposed, at least partially, within each other. For example, a nose piece can be disposed, at least partially, within a sleeve of the valve to provide support for other components (e.g., a bushing, a piston, a spring, etc.). It may be desirable to have a retention mechanism that retains the nose piece to the sleeve when the valve is being handled (e.g., shipped, packaged, etc.) such that the nose piece is not disassembled from the sleeve prior to installation of the valve in a hydraulic system. It is with respect to these and other considerations that the disclosure made herein is presented.

SUMMARY

The present disclosure describes implementations that relate to a polygon wire ring for retaining an internal component of a valve to an external component thereof.

In a first example implementation, the present disclosure describes a valve. The valve includes: (i) an external component having a longitudinal cavity therein, wherein the external component comprises a first annular groove disposed on an interior peripheral surface of the external component, wherein the first annular groove comprises a first base; (ii) an internal component disposed, at least partially, in the longitudinal cavity of the external component, wherein the internal component comprises a second annular groove disposed on an exterior peripheral surface of the internal component, wherein the second annular groove comprises a second base, and wherein the second annular groove is aligned, at least partially, with the first annular groove, such that the first annular groove and the second annular groove form an annular space therebetween; and (iii) a wire ring disposed in the annular space formed between the first annular groove and the second annular groove, wherein the wire ring is configured as a partial polygon comprising a plurality of curved sections interposed between a plurality of straight sections, wherein the wire ring contacts the first base at a plurality of contact points and contacts the second base at a respective plurality of contact points.

In a second example implementation, the present disclosure describes an assembly. The assembly includes a valve. The valve includes: (i) an external component having a longitudinal cavity therein, wherein the external component comprises a first annular groove disposed on an interior peripheral surface of the external component, wherein the first annular groove comprises a first base; (ii) an internal component disposed, at least partially, in the longitudinal cavity of the external component, wherein the internal component comprises a second annular groove disposed on an exterior peripheral surface of the internal component, wherein the second annular groove comprises a second base, and wherein the second annular groove is aligned, at least partially, with the first annular groove, such that the first annular groove and the second annular groove form an annular space therebetween; and (iii) a wire ring disposed in the annular space formed between the first annular groove and the second annular groove, wherein the wire ring is configured as a partial polygon comprising a plurality of curved sections interposed between a plurality of straight sections, wherein the wire ring contacts the first base at a plurality of contact points and contacts the second base at a respective plurality of contact points. The assembly also includes a manifold having a cavity configured to receive the valve therein. The manifold further includes a nose support shoulder, such that a gap separates a distal end of the internal component from the nose support shoulder of the manifold.

In a third example implementation, the present disclosure describes a method. The method includes: (i) providing a sleeve of a valve, the sleeve having a first annular groove disposed on an interior peripheral surface of the sleeve, wherein the first annular groove has a first base; (ii) providing a nose piece of the valve, wherein the nose piece includes a second annular groove disposed on an exterior peripheral surface of the nose piece, where the second annular groove has a second base; (iii) positioning a wire ring in the second annular groove of the nose piece, wherein the wire ring comprises a partial polygon having curved sections interposed between straight section; (iv) inserting the nose piece into the sleeve, wherein the sleeve has a chamfered annular surface disposed in the interior peripheral surface of the sleeve at a distal end thereof that causes the wire ring to be compressed as the nose piece is inserted into the sleeve; and (v) aligning the second annular groove of the nose piece with the first annular groove of the sleeve, thereby causing the wire ring to expand and assume an annular space formed between the second annular groove of the nose piece and the first annular groove of the sleeve, wherein an exterior surface of the wire ring contacts the first base of the first annular groove at multiple contact points, and wherein an interior surface of the wire ring contacts the second base of the second annular groove at multiple respective contact points.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

Example valves can include an external component having a cavity in which an internal component is inserted. For example, the valve can have a sleeve configured to include other components of the valve such as a bushing or nose piece that can be inserted, at least partially, within the sleeve. The valve can then be disposed in a cavity of a manifold, to operate within a hydraulic system.

However, during handling the valve prior to installation into the manifold (e.g., during packaging and shipping of the valve), it may be desirable to retain the internal component within the external component to preclude disassembly of the valve prior to installation within the manifold. It may be desirable for a retention mechanism to facilitate insertion of the internal component with a low force inside the external component, yet resist disassembly with a large force to enable the valve to withstand forces experienced during handling.

In examples, a wire ring can be used as a retainer. The term "wire ring" is used herein to indicate a ring or partial ring made of a metal wire. An annular groove can be formed on an exterior peripheral surface of the internal component and another annular groove can be formed on an interior peripheral surface of the external component, and the wire ring can be disposed in the annular space formed between the annular grooves. The wire ring can have interference (i.e., overlap) with both annular grooves, and thus retain the internal component within the external component when they are pulled apart from each other.

In an example, a wire ring that is circular in shape can be used (e.g., a C-clip ring). However, as a circular-shaped wire ring that is floating in the annular space between two annular grooves, the wire ring can be pushed to one annular groove when the sleeve 102 and the nose piece 104 move at an angle relative to teach other, such that the wire ring might not have interference with the other annular groove. In this case, the internal component can come loose (i.e., can be released, or easily popped-off) from the external component. Thus, during shipping and handling of the valve, the components can be undesirably disassembled from each other.

It may thus be desirable to have a wire ring configured to contact both annular grooves regardless of positions or movements of the components and regardless of the position of the wire ring within the annular grooves. This way, the wire ring can be continually interfering with both annular grooves to preclude disassembly of the components.

Disclosed herein, within examples, is a wire ring configured as a partial polygon. The configuration of the wire ring causes the wire ring to contact both the annular groove of the internal component and the annular groove of the external component at multiple contact points regardless of position of the wire ring within the annular grooves. The disclosed wire ring thus continually interferes with both annular grooves regardless of its position. In other words, there is no position of the wire ring at which the wire ring loses interference with either annular groove. This way, the wire ring can keep the internal component retained to the external component during shipping and handling of the valve.

Further, using the wire ring, rather than threads, to retain the internal component to the external component allows the internal component to be floating within the external component so as to allow for realignment of the internal component with other components of the valve so as to compensate or adjust for any manufacturing misalignments. Such a valve can be cheaper to manufacture due to elimination of threads and tolerance to misalignments.

Figure 1:
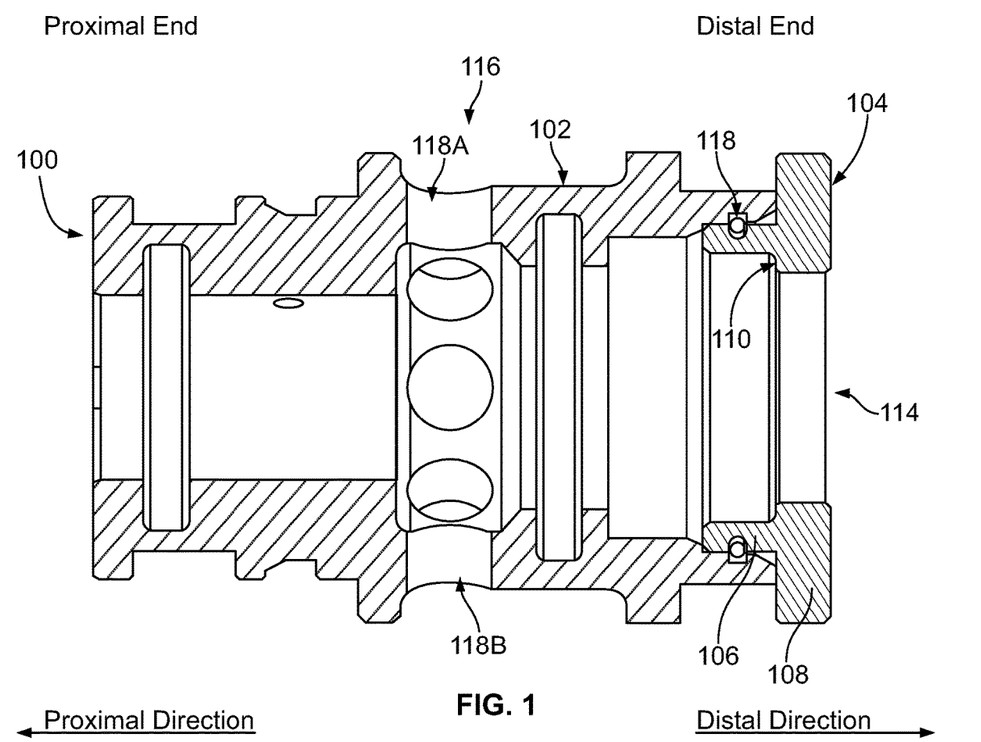
FIG. 1 illustrates a cross-sectional side view of a portion of a valve, in accordance with an example implementation.

FIG. 1 describes a cross-sectional side view of a portion of a valve 100, in accordance with an example implementation. The portion of the valve 100 shown in FIG. 1 includes a sleeve 102. The sleeve 102 can also be referred to as a cage. In examples, the sleeve 102 can be configured to be inserted within a housing (not shown) of the valve 100. For example, the housing can include a longitudinal cylindrical cavity therein and the longitudinal cylindrical cavity is configured to receive the sleeve 102 at a distal end of the housing.

The sleeve 102 includes a respective longitudinal cylindrical cavity therein. The longitudinal cylindrical cavity of the sleeve 102 is configured to receive a nose piece 104 at a distal end of the sleeve 102. The nose piece 104 can be cylindrical in shape and can have a stem portion 106 and a base or flange portion 108. The stem portion 106 extends within the sleeve 102, while the flange portion 108 is configured as a protrusion, rim, or enlarged-diameter portion that interfaces with or rests against a distal end of the sleeve 102.

The valve 100 can include movable elements disposed within the sleeve 102 such as poppets, spools, or pistons (not shown). In some cases, one or more of these movable elements can be biased in a given direction via a spring. The nose piece 104 forms an annular shoulder 110 that can be configured to support a distal end of such a spring, whereas a proximal end of the spring contacts the movable element to bias it in a proximal direction, for example.

The nose piece 104 defines a first port 114 at a nose or distal end of the nose piece 104. The nose piece 104 is hollow as depicted in FIG. 1 to allow fluid to flow therethrough to or from the first port 114.

The sleeve 102 includes a second port 116 comprising cross-holes such as cross-holes 118A, 118B disposed in a radial array about the sleeve 102. The valve 100 can, for example, be configured to control flow of fluid between the first port 114 and the second port 116. Particularly, a movable element (e.g., a poppet) can be disposed within the sleeve 102 and can be configured to block fluid flow between the first port 114 and the second port 116 when the valve 100 is unactuated, i.e., when the movable element is in a first position. When the valve 100 is actuated (e.g., manually or via an electric or hydraulic signal) the movable element can move axially within the sleeve 102 to a second position to allow fluid flow between the first port 114 and the second port 116.

As described below with respect to FIG. 7, the valve 100 is configured to be inserted within a cavity of a manifold such that the first port 114 and the second port 116 of the valve 100 align with respective ports of the manifold for communication of fluid therebetween. Such manifold can include other valves and hydraulic components and can be fluidly coupled (e.g., via pipes or hoses) to a source of pressurized fluid (e.g., a pump or accumulator) and a reservoir or tank having fluid at a low or atmospheric pressure.

In examples, however, the valve 100 is handled, packaged, and shipped to a location where it is then installed in the manifold. As such, it may be desirable to retain the nose piece 104 to the sleeve 102 prior to installation of the valve 100 in a manifold to preclude the nose piece 104 from popping off (i.e., coming loose or being disassembled from) the sleeve 102.

In some conventional valves, an internal component (e.g., a nose piece) of a valve can be coupled to an external component (e.g., a housing) via a threaded joint. Using threads is costly and can involve tight tolerances. The valve 100 includes retention methodology and components that render the valve 100 less costly to manufacture and can ensure that the components are not disassembled during shipping and handling prior to installation in a manifold.

Particularly, the valve 100 includes a wire ring 118 configured to retain the nose piece 104 within the sleeve 102. The wire ring 118 is disposed in respective annular grooves formed in the sleeve 102 and the nose piece 104.

Figure 2:
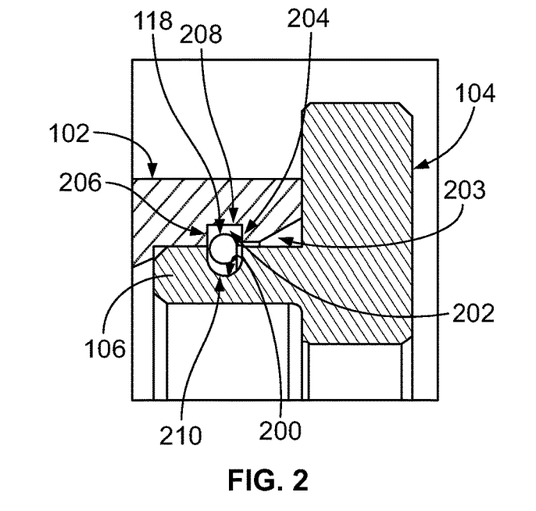
FIG. 2 illustrates a partial cross-sectional of a sleeve and a nose piece with a wire ring configured to retain the nose piece to the sleeve, in accordance with an example implementation.

FIG. 2 illustrates a partial cross-sectional of the sleeve 102 and the nose piece 104 with the wire ring 118 configured to retain the nose piece 104 to the sleeve 102, in accordance with an example implementation. Particularly, FIG. 2 depicts a zoomed-in view of a portion of the assembly of the sleeve 102 and the nose piece 104 (i.e., top, right portion of the assembly shown in FIG. 1).

As depicted in FIG. 2, the nose piece 104 defines on an exterior peripheral surface of the stem portion 106 an annular groove 200. The sleeve 102 defines on an interior peripheral surface thereof an annular groove 202 that is aligned, at least partially, with the annular groove 200.

In an example, to install the nose piece 104 within the sleeve 102, first the wire ring 118 can be disposed in the annular groove 200 prior to insertion of the nose piece 104 into the sleeve 102. As described below, the wire ring 118 is flexible or compliant (e.g., behaves like a spring) in a transverse direction (i.e., up and down in FIGS. 1-2) and can thus be compressed and decompressed or expanded.

The sleeve 102 can have a chamfered annular surface 203 at an end thereof that causes the wire ring 118 to be slightly compressed as the nose piece 104 is inserted into the sleeve 102. Once the annular groove 202 is aligned with the annular groove 200, the wire ring 118 is decompressed or substantially decompressed and assumes the annular space formed between the annular groove 200 and the annular groove 202 as shown in FIGS. 1-2.

The annular groove 202 is bounded by a first annular surface 204 and a second annular surface 206. The annular groove 202 also has a base 208 bounded by the first annular surface 204 and the second annular surface 206. The first annular surface 204 and the second annular surface 206 can be substantially straight (e.g., form a substantially 90 degree angle with, i.e., perpendicular to, the base 208). The annular groove 200 has a semi-circular cross section as shown in FIG. 2 and has a base 210.

The wire ring 118 is disposed in annular space formed between the annular groove 200 and the annular groove 202. Particularly, the wire ring 118 is partially disposed in the annular groove 200 and partially disposed within the annular groove 202. This way, if the sleeve 102 and the nose piece 104 are pulled apart during shipping and handling, the wire ring 118 contacts or interferes with both the sleeve 102 and the nose piece 104, thereby retaining them to each other or precluding the nose piece 104 from popping off or being disassembled from the sleeve 102.

If the wire ring 118 has a circular shape and a circular cross section, it can float within the annular grooves 200, 202, i.e., the wire ring 118 can be allowed to move within the annular space between the annular grooves 200, 202. In this case, under some operating conditions, the wire ring 118 might be pushed into one of the annular grooves 200, 202 while having no or minimal contact or interference with the other annular groove and its associated component. For instance, if the wire ring 118 has a circular shape, it might be pushed into the annular groove 200 and substantially lose contact with the annular groove 202 of the sleeve 102. Conversely, the wire ring 118 might be pushed into the annular groove 202 and substantially lose contact with the annular groove 200 of the nose piece 104. Thus, if the wire ring 118 has a circular shape, then under some operating conditions, as the sleeve 102 and the nose piece 104 are pulled apart, the wire ring 118 can lose contact or interference with the sleeve 102 or the nose piece 104, and thus they can be disassembled from each other under a small pulling force.

It might therefore not be desirable for the wire ring 118 to have a circular shape. Rather, it may be desirable to configure the wire ring 118 to have a particular geometric shape that ensures contact and continual interference with both the sleeve 102 and the nose piece 104 regardless of the operating condition. In other words, it may be desirable to configure the wire ring 118 such that the wire ring 118 cannot be pushed into one of the annular grooves 200, 202 while losing interference with the other.

Figure 3:
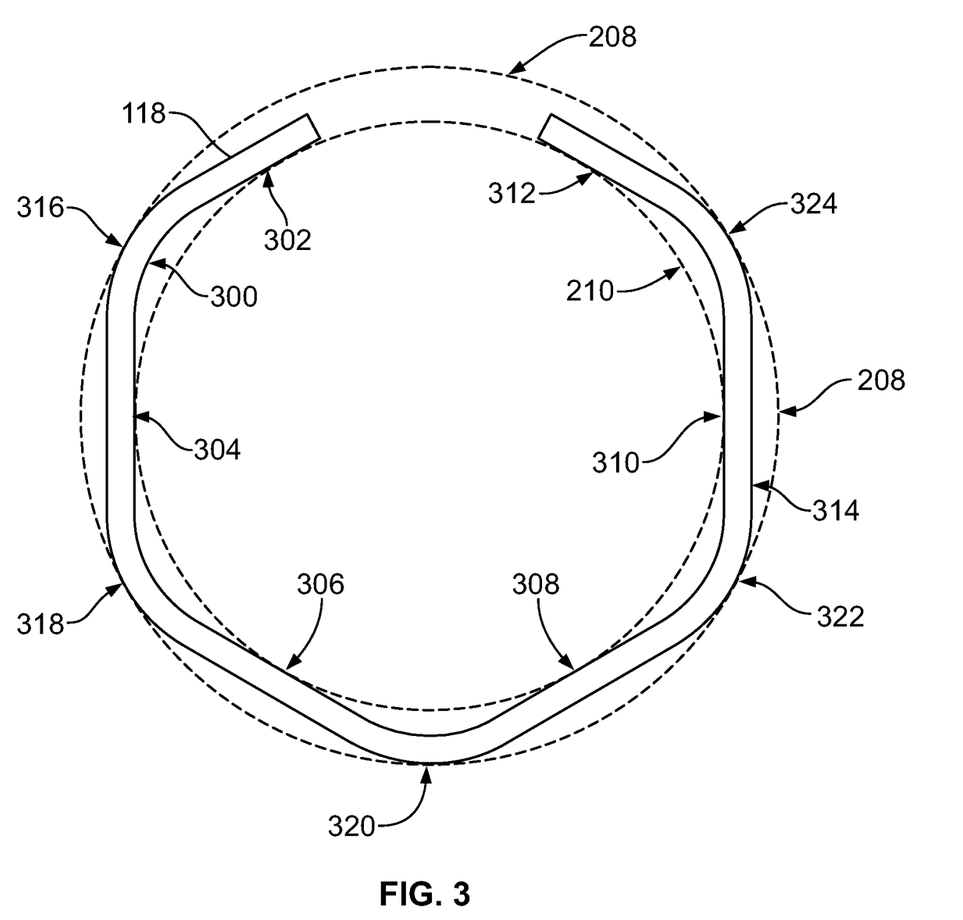
FIG. 3 illustrates a front view of a wire ring configured as a partial polygon, in accordance with another example implementation.

FIG. 3 illustrates a front view of the wire ring 118 configured as a partial polygon, in accordance with an example implementation. In FIG. 3, the base 208 of the annular groove 202 and the base 210 of the annular groove 200 are depicted by dashed circular lines.

As shown in FIG. 3, the configuration of the wire ring 118 as a partial polygon allows the wire ring 118 to contact the annular groove 200 (i.e., contact the base 210) at multiple contact points, and at the same time contact the annular groove 202 (i.e., contact the base 208) at multiple respective contact points. For instance, an interior surface 300 of the wire ring 118 contacts the base 210 at six contact points 302, 304, 306, 308, 310, and 312. Similarly, an exterior surface 314 of the wire ring 118 contacts the base 208 at five contact points 316, 318, 320, 322, and 324.

As shown in FIG. 3, the wire ring 118 is configured to include five curved sections interposed between six straight sections. This configuration allows the exterior surface 314 of the wire ring 118 to contact the base 208 of the annular groove 202 at the aforementioned multiple contact points 316-324, while allowing the interior surface 300 of the wire ring 118 to contact the base 210 of the annular groove 200 at the aforementioned multiple contact points 302-312.

Figure 4:
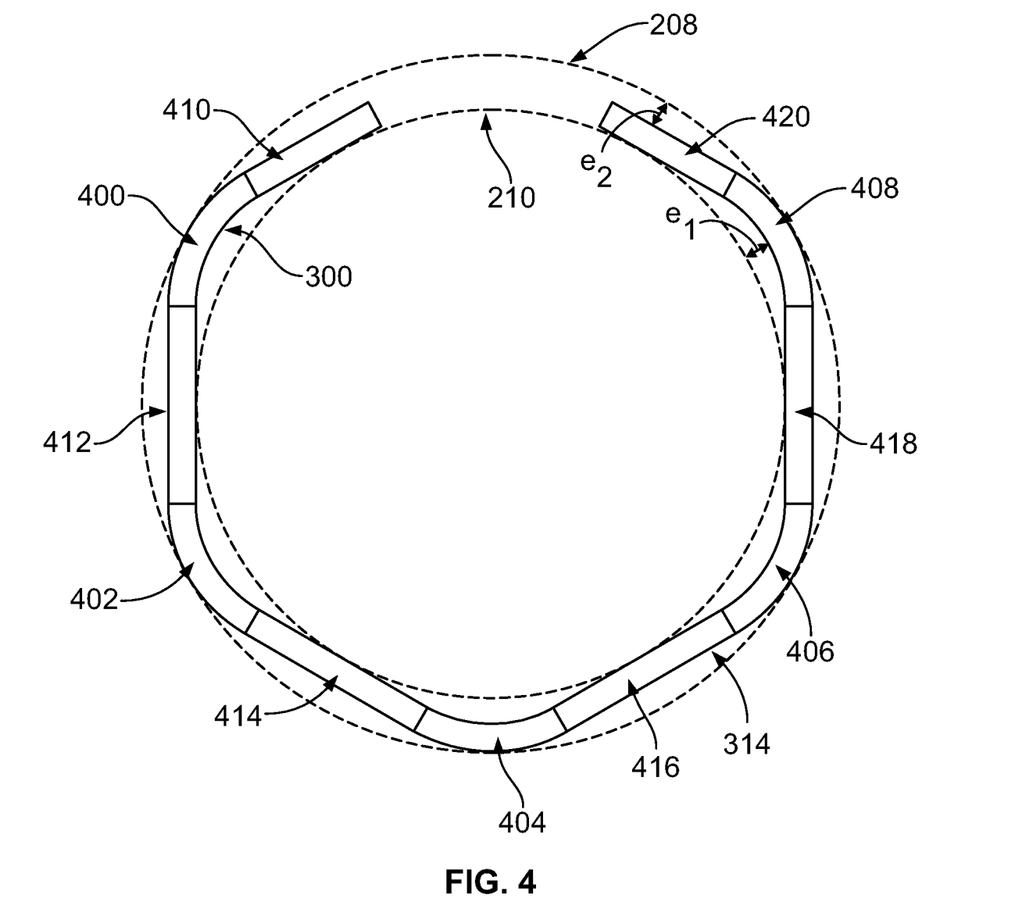
FIG. 4 illustrates a wire ring having curved sections interposed between straight sections, in accordance with another example implementation.

FIG. 4 illustrates the wire ring 118 having curved sections 400, 402, 404, 406, and 408 interposed between straight sections 410, 412, 414, 416, 418, and 420, in accordance with an example implementation. In FIG. 4, the wire ring 118 is divided into multiple sections marked by lines that separate curved sections from straight sections. However, it should be understood that the wire ring 118 might not be physically divided into multiple sections, and the dividing lines in FIG. 4 are used to demarcate the multiple sections.

As shown in FIG. 4, the curved section 400 is disposed between and connects the straight section 410 and the straight section 412; the curved section 402 is disposed between and connects the straight section 412 and the straight section 414; the curved section 404 is disposed between and connects the straight section 414 and the straight section 416; the curved section 406 is disposed between and connects the straight section 416 and the straight section 418; and the curved section 408 is disposed between and connects the straight section 418 and the straight section 420.

While the interior surface 300 of the wire ring 118, and particularly of the straight sections 410-420, contacts the base 210 of the annular groove 200, the curvature of the curved sections 400-408 allows the wire ring 118 to protrude outward such that the exterior surface 314 of the wire ring 118, and particularly of the curved sections 400-408, to contact the base 208 of the annular groove 202. With this configuration, the flat surfaces of the straight sections 410-420 are tangential to the base 208, whereas curved portions of the curves sections 400-408 are tangential to the base 210, and the wire ring 118 maintains contact with both the base 208 and the base 210 at multiple contact points. Thus, the wire ring 118 continually maintains interference with side surfaces of the annular groove 200 and the annular groove 202 (e.g., the annular surfaces 204, 206). This way, regardless of movement of the sleeve 102 or the nose piece 104, whenever the sleeve 102 and the nose piece 104 are pulled apart, the wire ring 118 retains them together.

Notably, the curved sections 400-408 are wound in the same direction. For example, starting at the straight section 410, the curved sections 400-408 all curve in a counter-clockwise direction. Similarly, starting at the straight section 420, the curved sections 408-400 all curve in a clockwise direction.

Also notably, the wire ring 118 is configured as a partial polygon as opposed to a complete polygon. In other words, the wire ring 118 is open-ended, where the end sections, i.e., the straight sections 410, 420 disposed at both ends of the wire ring 118, are disconnected from each other and thus partial polygon is incomplete. As mentioned below, the wire ring 118 being incomplete or configured as a partial polygon can render the wire ring 118 flexible and facilitates mounting the wire ring 118 to the annular groove 200 during assembly of the nose piece 104 to the sleeve 102. As an example for illustration, the spacing between the two ends of the wire ring 118 can be about 12-14% of a length of the wire ring 118.

Further, the wire ring 118 is made of a compliant material that can flex to assume the annular space between the annular grooves 200, 202. For example, the wire ring 118 can be made of a steel wire having music spring quality, e.g., ASTM A-228 material, ASTM A229 MB Carbon, ASTM A230 Valve Carbon, or ASTM A1000 Grade B Carbon. These materials are examples for illustration only. Other materials that are hard (e.g., having carbon content) and compliant can be used. In examples, the material of the wire ring 118 can be hardened to preclude the mating components (i.e., the sleeve 102 and the nose piece 104) from "pinching" the wire ring 118 and deforming it if the mating components are hardened.

The combination of the wire ring 118 being configured as a partial polygon with disconnected ends and the compliance of its material, the wire ring 118 is flexible or compliant and can be compressed and expanded. During installation of the valve 100, the wire ring 118 can be expanded by allowing the straight sections 410, 420 to move apart and outward. Then, the wire ring 118 can be placed in the annular groove 200 of the nose piece 104. The wire ring 118 can then be compressed to allow the nose piece 104 to be inserted within the sleeve 102 until the annular groove 200 is aligned with the annular groove 202 of the sleeve 102. At that point, the flexibility of the wire ring 118 causes it to be released and expand to assume the annular space between the annular grooves 200, 202.

The configuration of the wire ring 118 as shown in FIGS. 3-4 allows the straight sections 410-420 to have respective gaps with the base 208 of the annular groove 202, and allow the curved sections 400-408 to have respective gaps with the base 210 of the annular groove 200. For example, the curved section 408 forms a gap "$e_1$" with the base 210, whereas the straight section 420 forms a gap "$e_2$" with the base 208.

These gaps along with the flexibility of the wire ring 118 allow the wire ring 118 to compensate for manufacturing tolerance variations in the annular grooves 200, 202.

For example, in some cases, the diameter of base 210 can be made smaller than a nominal desired diameter and/or the diameter of the base 208 is made larger than a respective nominal desired diameter due to manufacturing tolerances during manufacturing of the sleeve 102 and the nose piece 104. In these cases, the flexibility of the wire ring 118 allows it to assume the annular space between the annular grooves 200, 202 while contacting both the base 208 and the base 210 at multiple contact points. Manufacturing tolerance variations can make the gaps "$e_1$" and "$e_2$" change, yet the wire ring 118 maintains contact with the bases 208, 210 and interference with the annular grooves 200, 202.

For instance, if a distance between the base 208 and the base 210 increases compared to a nominal distance due to manufacturing tolerances, the curved sections 400-408 can bulge outward, while the straight sections 410-420 can protrude further inward, thereby increasing the gaps "$e_1$" and "$e_2$" while maintaining contact with the bases 208, 210. Conversely, if a distance between the base 208 and the base 210 decreases compared to the nominal distance due to manufacturing tolerances, the curved sections 400-408 can be compressed inward, while the straight sections 410-420 can be stretched outward, thereby decreasing the gaps "$e_1$" and "$e_2$" while maintaining contact with the bases 208, 210.

With this configuration, as the sleeve 102 and the nose piece 104 move relative to each other and are pulled apart from each other during shipping and handling, the wire ring 118 maintains contact with both the base 208 and the base 210 at multiple respective contact points. This way, the wire ring 118 maintains interference with (i.e., maintains interference with side surfaces of) both annular grooves 200, 202 regardless of the condition, dimensions or manufacturing tolerances, or respective positions of the sleeve 102 and the nose piece 104. Thus, the wire ring 118 cannot be pushed into one of the annular grooves 200, 202 while losing contact with the other. As such, the wire ring 118 effectively maintains the nose piece 104 retained to the sleeve 102.

FIGS. 3-4 illustrates the wire ring 118 as a partial hexagon. Particularly, as depicted in FIGS. 3-4, the wire ring 118 has six sides (i.e., depicted as a six-sided polygon).

Figure 5:
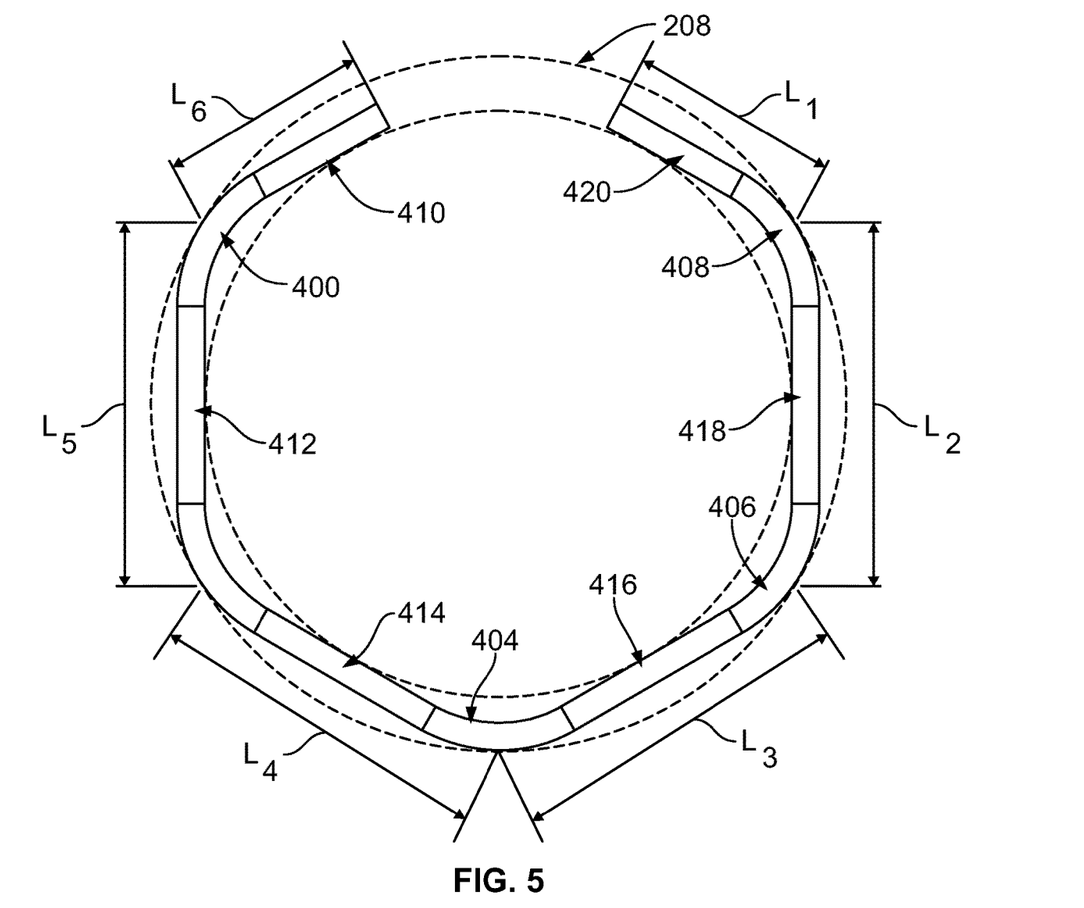
FIG. 5 illustrates six sides of a wire ring, in accordance with an example implementation.

FIG. 5 illustrates six sides of the wire ring 118, in accordance with an example illustration. As shown, the portion of the wire ring 118 from an end of the straight section 420 to a center of the curved section 408 can be considered a first side "$L_1$" of the hexagon. The portion of the wire ring 118 from the center of the curved section 408 to a center of the curved section 406 can be considered a second side "$L_2$" of the hexagon. The portion of the wire ring 118 from the center of the curved section 406 to a center of the curved section 404 can be considered a third side "$L_3$" of the hexagon. The portion of the wire ring 118 from the center of the curved section 404 to a center of the curved section 402 can be considered a fourth side "$L_4$" of the hexagon. The portion of the wire ring 118 from the center of the curved section 402 to a center of the curved section 400 can be considered a fifth side "$L_5$" of the hexagon. The portion of the wire ring 118 from the center of the curved section 400 to an end of the straight section 410 can be considered a sixth side "$L_6$" of the hexagon. With this configuration, each of the six sides $L_1$-$L_6$ comprise at least a portion of a straight section of the straight sections 410-420, and at least a portion of a curved section of the curved sections 400-408.

The six sides $L_1$-$L_6$ are connected by curved portions of the curved sections 400-408. Further, the wire ring 118 is a partial hexagon such that the first side $L_1$ and sixth side $L_6$ of the hexagon are not complete and do not meet or connect.

The configuration of the wire ring 118 as a partial hexagon in FIGS. 3-5 is an example for illustration. Other example polygons are possible. For example, the wire ring 118 can be configured as a partial quadrilateral polygon (e.g., parallelogram, the trapezoid, or the rhombus). In other examples, the wire ring 118 can be configured as other types of polygons, such as a pentagon (five-sided polygon), a heptagon (seven-sided polygon), an octagon (eight-sided polygon), etc. Different types of polygons can have different number of straight sections and different numbers of curved sections based on the number of sides the polygon has.

Further, although the wire ring 118 is shown in FIGS. 1-2 to have a circular cross section, in other example implementations the wire ring 118 can have a cross section having a different geometric shape, such as a square-, rectangular-, or rhombus-shaped cross section. In examples, a cross-sectional diameter or width of the wire ring 118 is smaller than a width of the annular groove 202 (i.e., width of the base 208 or axial distance between the annular surfaces 204, 206).

Further, as mentioned above, the first annular surface 204 and the second annular surface 206 are substantially straight (e.g., form a substantially 90 degree angle with the base 208). With this configuration, if the sleeve 102 and the nose piece 104 move axially relative to each other during handling, the annular surfaces 204, 206 do not form a ramp that would allow the wire ring 118 to be pushed or rolled farther into the annular groove 200. However, in another example, the annular groove 202 can be configured similar to the annular groove 200 having a semi-circular cross section. In another example, the annular groove 200 can be configured similar to the annular groove 202 with substantially straight annular side surfaces bounding the annular groove 200.

Figure 6:
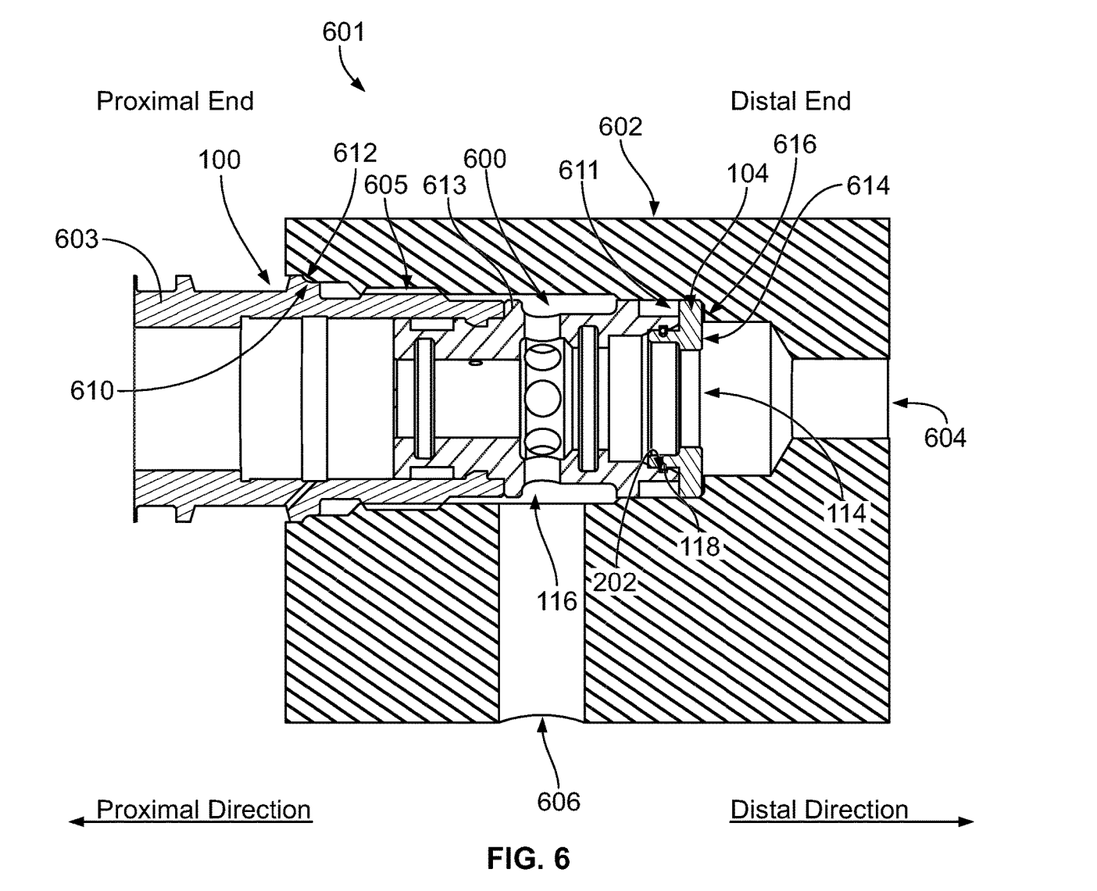
FIG. 6 illustrates a partial cross-sectional view of a valve installed in a cavity of a manifold, in accordance with an example implementation.

FIG. 6 illustrates a partial cross-sectional view of an assembly 601 of the valve 100 installed in a cavity 600 of a manifold 602, in accordance with an example implementation. Particularly, FIG. 6 illustrates the valve 100 having a housing 603 having the sleeve 102 disposed partially therein. A portion of the housing 603, the sleeve 102, and the nose piece 104 are disposed in the manifold 602.

The manifold 602 is configured to have a first port 604 configured to align with and be fluidly coupled to the first port 114 of the nose piece 104. The manifold 602 is configured to also have a second port 606 configured to align with and be fluidly coupled to the second port 116 of the sleeve 102.

The cavity 600 of the manifold 602 is configured to receive the valve 100 therein. Particularly, the manifold 602 includes a threaded region disposed on an interior peripheral surface of the manifold 602 and the housing 603 includes at respective threaded region disposed on an exterior peripheral surface of the housing 603. The housing 603 is inserted and screwed into the cavity 600 to threadedly engage with the manifold 602 at threaded region 605 representing threaded engagement of the threaded region of the housing 603 and the threaded region of the manifold 602. Further, when the valve 100 is inserted and screwed within the manifold 602, a housing locating shoulder 610 of the housing 603 mates with a manifold locating shoulder 612 to enable alignment of the housing 603 within the cavity 600 of the manifold 602.

In an example, if pressurized fluid is received at the first port 604, the nose piece 104 can be thrusted or pushed in the proximal direction such that a shoulder 611 of the nose piece 104 rests or is secured against the distal end of the sleeve 102. In turn, the sleeve 102 is thrusted or pushed in the proximal direction, such that a shoulder 613 of the sleeve 102 rests or is secured against the distal end of the housing 603. In this example, a small gap can separate a distal end 614 of the nose piece 104 from a nose support shoulder 616 formed in the manifold 602. As an example for illustration only, the gap can be an axial distance of about 0.01 in.

In another example, if pressurized fluid pressurized fluid is received at the second port 606, the nose piece 104 can be thrusted or pushed in the distal direction such that the distal end 614 of the nose piece 104 mates with and is secured against the nose support shoulder 616 of the manifold 602. In this example, the gap no longer separates the distal end 614 of the nose piece 104 from the nose support shoulder 616.

With this configuration, the nose piece 104 is "floating" and is allowed to have some axial "play" as it traverses the gap back and forth during operation of the valve 100. In an example, the sleeve 102 can also move axially along with the nose piece 104 in the distal direction and the sleeve 102 is also floating within the housing 603.

In conventional valves, a nose piece is typically swaged-in, or screwed via threaded engagement into, a sleeve and is not configured to have axial "play." In other conventional valves a threaded nut can be used to retain the nose piece within a sleeve and the nut threadedly engages the sleeve rather than the nose piece. Such configurations of conventional valves are more expensive due to the cost associated with swaging or machining threads in both the nose piece or nut and the sleeve. Also, in such convention valves, a seal is added between the nose piece and the sleeve to seal any clearance therebetween. Further, any misalignment between the nose piece and the sleeve due to manufacturing tolerances can result in leakage, rendering the valve inoperable.

In contrast with such conventional valves, the nose piece 104 is floating within the sleeve 102 and is allowed to move axially within the cavity 600 relative to the sleeve 102. This configuration eliminates the seal that exists in conventional valves between the nose piece and the sleeve.

Also, the nose piece 104 being floating in the disclosed configuration of FIG. 6, allows for less-tight manufacturing tolerances to be used in making the valve 100 and the manifold 602 compared to conventional valves. Particularly, the configuration of the valve 100 with the nose piece 104 being floating can compensate for any lack of, or deviation in, concentricity between the nose piece 104 and the sleeve 102, for example.

Further, by virtue of the sleeve 102 being also floating within the housing 603, and the nose piece 104 being floating within the sleeve 102, the torque applied to the housing 603 to tighten the threaded engagement at the threaded region 605 is not transferred to the sleeve 102 or the nose piece 104. As such, operation of the valve 100 is not sensitive to the torque applied to the housing 603. In contrast, conventional valves can be torque-sensitive because they typically have the sleeve threaded within the housing and/or the nose piece threaded within the sleeve, and therefore the clamping force or the torque applied to tighten the threads of the housing, is transferred to the sleeve and/or the nose piece, thereby rendering such conventional valves torque-sensitive. Such torque-sensitive configuration of conventional valves can limit the pressure level at which the valve can operate. In contrast, the configuration of the valve 100, which renders the valve 100 torque-insensitive, allows the valve 100 to operate at high pressure levels, e.g., greater than 5000 pounds per square inch (psi).

Notably, in examples, the gap between the distal end 614 of the nose piece 104 and the nose support shoulder 616 of the manifold 602 can be smaller than a width of the annular groove 202 in which the wire ring 118 is disposed (i.e., width of the base 208 or axial distance between the annular surfaces 204, 206). As such, as the nose piece 104 and the sleeve 102 can move axially during operation of the valve 100, the wire ring 118 is not subjected to substantial compressive axial force. With this configuration, the wire ring 118 might not deteriorate during operation of the valve 100, and they maintain their ability to retain the nose piece 104 within the sleeve 102 when the valve 100 is removed from the cavity 600 for maintenance purposes.

Figure 7:
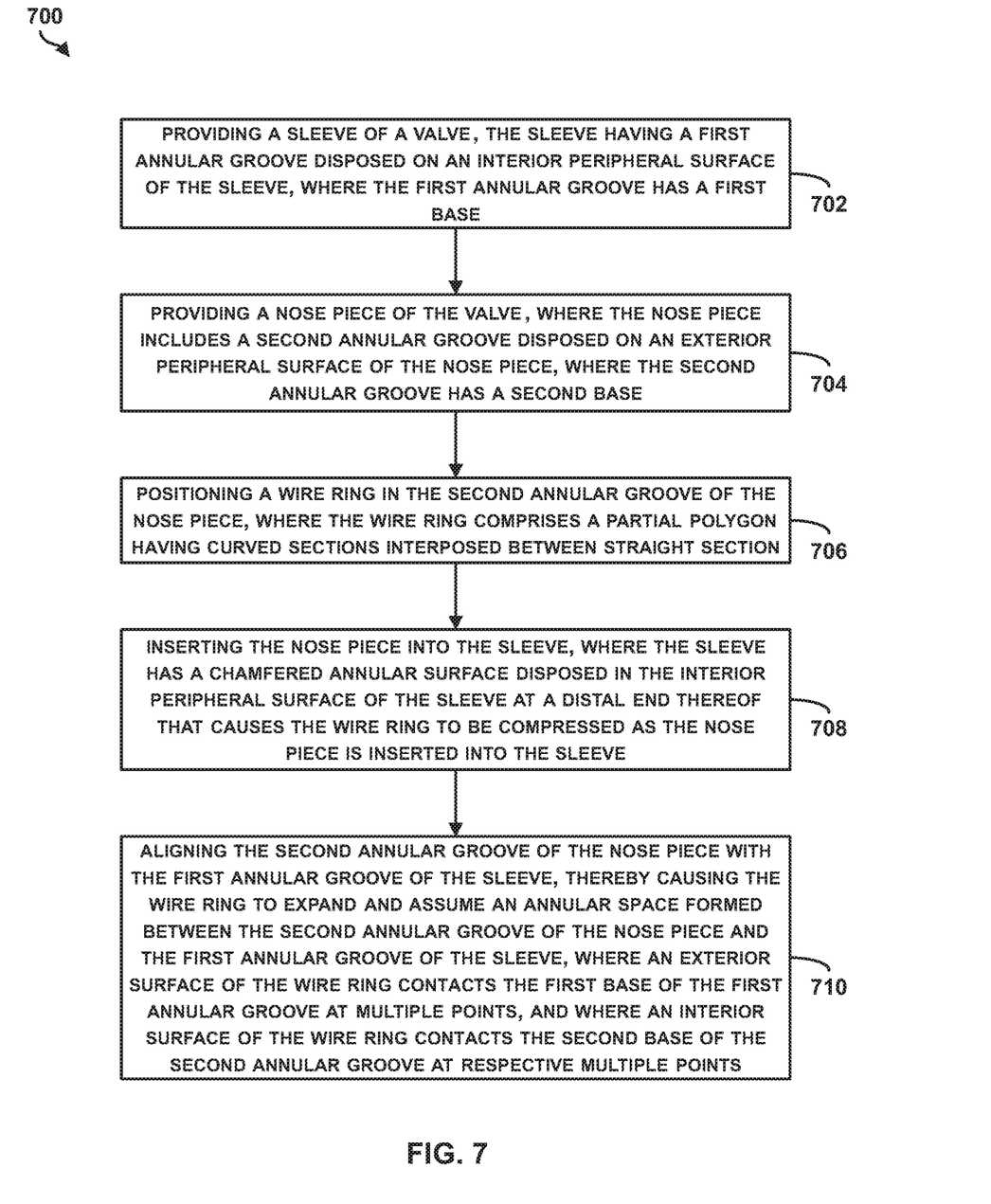
FIG. 7 is a flowchart of a method of assembling a nose piece to a sleeve of a valve, in accordance with an example implementation.

FIG. 7 illustrates a flowchart of a method 700 of assembling a nose piece to a sleeve of a valve, in accordance with an example implementation. The method 700 shown in FIG. 7 presents an example of a method that could be used with the valve 100 described above.

The method 700 may include one or more operations, functions, or actions as illustrated by one or more of blocks 702-710. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

Although the method 700 is related to assembling a nose piece (e.g., the nose piece 104) to a sleeve (e.g., the sleeve 102), the method 700 is applicable to any two components of a valve. In particular, the method 700 can be used for assembling any internal component of a valve (e.g., a nose piece, a sleeve, a bushing, etc.) to an external component (e.g., a cage, a housing, a sleeve, etc.).

At block 702, the method 700 includes providing the sleeve 102 of the valve 100, the sleeve 102 having the annular groove 202 disposed on an interior peripheral surface of the sleeve 102, where the annular groove 202 has the base 208.

The term "providing" as used herein, and for example with regard to the sleeve 102 or other components, includes any action to make the sleeve 102 or any other component available for use, such as bringing the sleeve 102 or component to an apparatus or to a work environment for further processing.

At block 704, the method 700 includes providing the nose piece 104 of the valve 100, where the nose piece 104 includes the annular groove 200 disposed on an exterior peripheral surface of the nose piece 104, where the annular groove 200 has the base 210.

At block 706, the method 700 includes positioning the wire ring 118 in the annular groove 200 of the nose piece 104, where the wire ring 118 comprises a partial polygon having curved sections (e.g., the curved sections 400-408) interposed between straight section (e.g., the straight sections 410-420). As mentioned above, the wire ring 118 being incomplete or configured as a partial polygon in addition to being made of a compliant material can render the wire ring 118 flexible and facilitates mounting the wire ring 118 to the annular groove 200 during assembly. For example, the wire ring 118 can be held at both of its ends that do not meet, then expanded, and then positioned in the annular groove 200.

At block 708, the method 700 includes inserting the nose piece 104 into the sleeve 102, where the sleeve 104 has the chamfered annular surface 203 disposed in the interior peripheral surface of the sleeve 102 at a distal end thereof that causes the wire ring 118 to be compressed as the nose piece 104 is inserted into the sleeve 102.

At block 710, the method 700 includes aligning the annular groove 200 of the nose piece 104 with the annular groove 202 of the sleeve 102, thereby causing the wire ring 118 to expand and assume an annular space formed between the annular groove 200 of the nose piece 104 and the annular groove 202 of the sleeve 102, where the exterior surface 314 of the wire ring 118 contacts the base 208 of the annular groove 202 at multiple contact points (e.g., the contact points 316-324), and where the interior surface 300 of the wire ring 118 contacts the base 210 of the annular groove 200 at multiple respective contact points (e.g., the contact points 302-312). With this configuration, the wire ring 118 is configured to retain the nose piece 104 to the sleeve 102 as the nose piece 104 and the sleeve 102 move relative to each other during handling and shipping of the valve 100.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A valve comprising:
    an external component having a longitudinal cavity therein, wherein the external component comprises a first annular groove disposed on an interior peripheral surface of the external component, wherein the first annular groove comprises a first base;
    an internal component disposed, at least partially, in the longitudinal cavity of the external component, wherein the internal component comprises a second annular groove disposed on an exterior peripheral surface of the internal component, wherein the second annular groove comprises a second base, and wherein the second annular groove is aligned, at least partially, with the first annular groove, such that the first annular groove and the second annular groove form an annular space therebetween; and
    a wire ring disposed in the annular space formed between the first annular groove and the second annular groove, wherein the wire ring is configured as a partial polygon comprising a plurality of curved sections interposed between a plurality of straight sections, wherein the wire ring contacts the first base at a plurality of contact points and contacts the second base at a respective plurality of contact points, wherein a width of the first annular groove is greater than a cross-sectional diameter of the wire ring, such that the internal component is floating and is allowed to move axially relative to the external component.

2. The valve of claim 1, wherein the plurality of straight sections of the wire ring contact the second base at the respective plurality of contact points, whereas the plurality of curved sections of the wire ring contact the first base at the plurality of contact points.

3. The valve of claim 1, wherein the first annular groove is bounded by two annular surfaces perpendicular to the first base.

4. The valve of claim 3, wherein the width of the first annular groove comprises an axial distance between the two annular surfaces.

5. The valve of claim 1, wherein the second annular groove comprises a semi-circular cross section.

6. The valve of claim 1, wherein the partial polygon comprises a partial hexagon having six sides, wherein the partial hexagon is open-ended such that two end sections of the partial hexagon are disconnected.

7. The valve of claim 6, wherein each side of the six sides comprises at least a portion of a straight section of the plurality of straight sections and at least a portion of a curved section of the plurality of curved sections.

8. The valve of claim 6, wherein the partial hexagon comprises six straight sections respectively contacting the second base at six contact points, and wherein the partial hexagon comprises five curved sections respectively contacting the first base at five contact points.

9. The valve of claim 1, wherein a gap separates each straight section of plurality of straight sections from the first base of the first annular groove, and wherein a respective gap separates each curved section of plurality of curved sections from the second base of the second annular groove.

10. An assembly comprising:
    a valve comprising:
        an external component having a longitudinal cavity therein, wherein the external component comprises a first annular groove disposed on an interior peripheral surface of the external component, wherein the first annular groove comprises a first base,
        an internal component disposed, at least partially, in the longitudinal cavity of the external component, wherein the internal component comprises a second annular groove disposed on an exterior peripheral surface of the internal component, wherein the second annular groove comprises a second base, and wherein the second annular groove is aligned, at least partially, with the first annular groove, such that the first annular groove and the second annular groove form an annular space therebetween, and
        a wire ring disposed in the annular space formed between the first annular groove and the second annular groove, wherein the wire ring is configured as a partial polygon comprising a plurality of curved sections interposed between a plurality of straight sections, wherein the wire ring contacts the first base at a plurality of contact points and contacts the second base at a respective plurality of contact points; and
    a manifold having a cavity configured to receive the valve therein, wherein the manifold comprises a nose support shoulder, such that a gap separates a distal end of the internal component from the nose support shoulder of the manifold, wherein a width of the first annular groove is greater than a cross-sectional diameter of the wire ring, such that the internal component is floating and is allowed to move axially relative to the external component and traverse the gap between the distal end of the internal component and the nose support shoulder of the manifold.

11. The assembly of claim 10, wherein the first annular groove is bounded by two annular surfaces perpendicular to the first base.

12. The assembly of claim 11, wherein the width of the first annular groove comprises an axial distance between the two annular surfaces of the first annular groove.

13. The assembly of claim 12, wherein the width is greater than the gap that separates the distal end of the internal component from the nose support shoulder of the manifold.

14. The assembly of claim 10, wherein the plurality of straight sections of the wire ring contact the second base at the respective plurality of contact points, whereas the plurality of curved sections of the wire ring contact the first base at the plurality of contact points.

15. The assembly of claim 10, wherein the partial polygon comprises a plurality of sides, wherein the partial polygon is open-ended such that two end sections of the partial polygon are disconnected.

16. The assembly of claim 15, wherein each side of the plurality of sides comprises at least a portion of a straight section of the plurality of straight sections and at least a portion of a curved section of the plurality of curved sections.

17. The assembly of claim 10, wherein the partial polygon comprises a partial hexagon having six sides, wherein the partial hexagon comprises six straight sections respectively contacting the second base at six contact points, and wherein the partial hexagon comprises five curved sections respectively contacting the first base at five contact points.

18. The assembly of claim 10, wherein a gap separates each straight section of plurality of straight sections from the first base of the first annular groove, and wherein a respective gap separates each curved section of plurality of curved sections from the second base of the second annular groove.

19. A method comprising:
- providing a sleeve of a valve, the sleeve having a first annular groove disposed on an interior peripheral surface of the sleeve, wherein the first annular groove has a first base;
- providing a nose piece of the valve, wherein the nose piece includes a second annular groove disposed on an exterior peripheral surface of the nose piece, where the second annular groove has a second base;
- positioning a wire ring in the second annular groove of the nose piece, wherein the wire ring comprises a partial polygon having curved sections interposed between straight section;
- inserting the nose piece into the sleeve, wherein the sleeve has a chamfered annular surface disposed in the interior peripheral surface of the sleeve at a distal end thereof that causes the wire ring to be compressed as the nose piece is inserted into the sleeve; and
- aligning the second annular groove of the nose piece with the first annular groove of the sleeve, thereby causing the wire ring to expand and assume an annular space formed between the second annular groove of the nose piece and the first annular groove of the sleeve, wherein an exterior surface of the wire ring contacts the first base of the first annular groove at multiple contact points, and wherein an interior surface of the wire ring contacts the second base of the second annular groove at multiple respective contact points.

20. The method of claim 19, wherein the first annular groove is bounded by two annular surfaces perpendicular to the first base, the method further comprising:
- inserting the valve into a cavity of a manifold, such that a gap separates a distal end of the nose piece from a nose support shoulder formed in the manifold, and wherein a width comprising axial distance between the two annular surfaces of the first annular groove is greater than the gap.

* * * * *